UNITED STATES PATENT OFFICE.

JACOB STEIGER, OF LONDON, ENGLAND.

MANUFACTURE OF CEMENT.

SPECIFICATION forming part of Letters Patent No. 627,884, dated June 27, 1899.

Application filed March 6, 1899. Serial No. 708,013. (No specimens.)

*To all whom it may concern:*

Be it known that I, JACOB STEIGER, manufacturer, a citizen of the Republic of Switzerland, residing at 24 Finsbury Square, in the city of London, England, have invented certain new and useful Improvements in the Manufacture of Cement, of which the following is a specification.

This invention relates to the manufacture of a cement in a dry pulverulent form which can be used in admixture with water and any suitable materials for the manufacture of artificial stone, artificial-fuel blocks, and many other articles, the cement serving to give coherence to the materials. For this purpose I take a solution of chlorid of magnesium and of silicate of potash or of silicate of soda, mix same thoroughly, and after the chemical change has taken place I reduce the mass by evaporation to a dry substance. After cooling the mass is ground to a fine powder. I also prepare in form of fine powder magnesia, such as that obtained by calcining magnesite. I thoroughly mix the powdered magnesia, the powdered combined chlorid of magnesium, and silicate of potash or of silicate of soda, prepared as above described, the mixture constituting a cement in form of a dry powder which can be used with water to cement any suitable materials together.

The proportions, by weight, of the ingredients are as follows: chlorid of magnesium, (dry,) twenty per cent. to twenty-five per cent.; silicate of soda, (or potash,) twelve per cent. to fifteen per cent.; magnesia, sixty to sixty-five per cent.

The main feature of the invention is the production of a dry mixture of chlorid of magnesium and silicate of potash or silicate of soda by means of evaporation of the two solutions, which in being mixed and exposed to heating are subjected to chemical changes. The quantities of the two solutions must be determined in such a manner that a small part of the chlorid of magnesium remains unchanged as surplus quantity, while the other part (about a half to two-thirds) is transformed into hydrosilicate of magnesium and chlorid of alkali. While the reduction of pure chlorid of magnesium to a powder can be accomplished with great difficulties only, and hardly without chemical changes, this process can easily be accomplished with above-described mixture. This is due partly to the presence of hydrosilicate of magnesium and partly to the influence of the chlorid of alkali, which latter forms with the chlorid of magnesium a permanent double salt. This dry mixture has also the advantage that the chlorid of magnesium as well as the silicate of magnesium retain their cementing qualities and act combined upon the calcined magnesia owing to their unchanged hydratic qualities.

Experience has shown that cement produced in the foregoing manner has been exposed to the air without showing signs of deliquescence and after mixture with water has shown remarkable strength and hardness. At the same time the tendency of chlorid of magnesium of attracting moisture in the air is eliminated, so that there can be no later sweating of the manufactured and hardened cement. This is due partly to a reduced amount of free chlorid of magnesium, owing to the combination of the latter with the silicate, but especially to the formation of a double salt by the surplus chlorid of magnesium with the chlorid of alkali, produced by the chemical action of the chlorid of magnesium on the silicate, which chlorid of alkali even exceeds the chlorid of magnesium in its cementing property. Of further favorable effect is the magnesium silicate produced in the same manner and reduced to a powder, because the silica contained therein is in such favorable easily-soluble hydrated condition that its hardening and cementing influence (which is simultaneous with the action of the chlorid of magnesium) upon the calcined magnesia becomes a prominent feature.

Tests have shown that only such mixtures of chlorid of magnesium and silicate which have been produced in the above-described manner have had a beneficial effect upon the hardness of the objects produced therewith, while the application of the two substances in liquid form or in powdered form, but dried separately and subsequently mixed, did not exercise the same favorable influence. This invention distinguishes itself therefore from processes hitherto known where silicates have been used by a mixture of chlorid of magnesium and of silicate of potash or soda, subsequent reduction to powder of the mass by means of evaporation, and the production of a dry mixture of chlorid of magnesium, chlorid of alkali, and silicate of magnesium, which can be transformed into a durable, dry, and highly-efficient cement by the addition of calcined magnesium.

I claim—

1. Process for the manufacture of a silicated magnesia cement in dry form, by mixing solutions of chlorid of magnesium and silicate of potash, or soda, reducing the mass, thus mixed, to a dry powder by heating and adding calcined magnesia, substantially as set forth.

2. Process for the manufacture of a silicated magnesia cement in dry form, consisting of mixing a solution of chlorid of magnesium with a solution of silicate of soda or potash in suitable proportions to form hydrosilicate of magnesium and chlorid of alkali and to leave a small part of unchanged chlorid of magnesium; evaporating; drying and powdering the mixture; and adding thereto a suitable proportion of powdered calcined magnesium, substantially as set forth.

In testimony whereof I have hereunto set my hand in presence of two subscribing witnesses.

JACOB STEIGER.

Witnesses:
RUDOLF DIETZ,
GUSTAVE HARR.

No references.